(12) United States Patent
Tagami

(10) Patent No.: US 10,701,235 B2
(45) Date of Patent: Jun. 30, 2020

(54) DOCUMENT READING DEVICE IDENTIFYING FRONT AND BACK FACES OF SAME DOCUMENT BASED ON RELATIVE POSITIONS OF CENTER OF GRAVITY OF CROPPED IMAGES

(71) Applicant: KYOCERA Document Solutions Inc., Osaka (JP)

(72) Inventor: Yuya Tagami, Osaka (JP)

(73) Assignee: KYOCERA Document Solutions Inc., Tamatsukuri, Chuo-ku, Osaka (JP)

( * ) Notice: Subject to any disclaimer, the term of this patent is extended or adjusted under 35 U.S.C. 154(b) by 0 days.

(21) Appl. No.: 16/473,408

(22) PCT Filed: Dec. 26, 2017

(86) PCT No.: PCT/JP2017/046811
§ 371 (c)(1),
(2) Date: Jun. 25, 2019

(87) PCT Pub. No.: WO2018/124146
PCT Pub. Date: Jul. 5, 2018

(65) Prior Publication Data
US 2020/0145552 A1  May 7, 2020

(30) Foreign Application Priority Data

Dec. 28, 2016 (JP) ................................. 2016-256864

(51) Int. Cl.
*H04N 1/203* (2006.01)
*H04N 1/387* (2006.01)
(Continued)

(52) U.S. Cl.
CPC ....... *H04N 1/2038* (2013.01); *H04N 1/00705* (2013.01); *H04N 1/00769* (2013.01);
(Continued)

(58) Field of Classification Search
None
See application file for complete search history.

(56) References Cited

U.S. PATENT DOCUMENTS 10,412,241 B2 * 9/2019 Ohwaku ............... H04N 1/0044
10,447,882 B2 * 10/2019 Mizude .................... H04N 1/10
(Continued)

FOREIGN PATENT DOCUMENTS

| JP | 2006-339770 A | 12/2006 |
| JP | 2013-250725 A | 12/2013 |
| JP | 2015-127936 A | 7/2015 |

*Primary Examiner* — Scott A Rogers
(74) *Attorney, Agent, or Firm* — IP Business Solutions, LLC

(57) ABSTRACT

An image forming apparatus includes a document reading unit configured to collectively read a plurality of source documents placed on a document table, a reference document image selector that selects, as a reference document image, an individual image representing the source document located closest to a position corresponding to a far left corner of the document table, a first relative position detector that detects a relative position between the reference document image and each of the individual images other than the reference document image, and a first pair identifier that identifies, as an image pair representing front and back faces of the same source document, a pair of individual images, the respective relative positions of which, from the reference document image in one of the both image data and from the reference document image in the other one of the both image data, are closest to each other.

6 Claims, 11 Drawing Sheets

(51) Int. Cl.
*H04N 1/38* (2006.01)
*H04N 1/04* (2006.01)
*H04N 1/00* (2006.01)

(52) U.S. Cl.
CPC ............... *H04N 1/04* (2013.01); *H04N 1/38* (2013.01); *H04N 1/387* (2013.01); *H04N 1/3873* (2013.01); H04N 1/00766 (2013.01); H04N 2201/0094 (2013.01)

(56) References Cited

U.S. PATENT DOCUMENTS

| | | |
|---|---|---|
| 2015/0146983 A1 | 5/2015 | Sakawaki |
| 2017/0048412 A1 | 2/2017 | Sakawaki |
| 2019/0132462 A1* | 5/2019 | Ogawa ............... H04N 1/00702 |
| 2019/0132471 A1* | 5/2019 | Fujita ..................... H04N 1/387 |
| 2019/0238710 A1* | 8/2019 | Arifuku ............. H04N 1/00453 |
| 2020/0028985 A1* | 1/2020 | Tagami .................. H04N 1/387 |
| 2020/0068083 A1* | 2/2020 | Ogasawara .......... H04N 1/2038 |

* cited by examiner

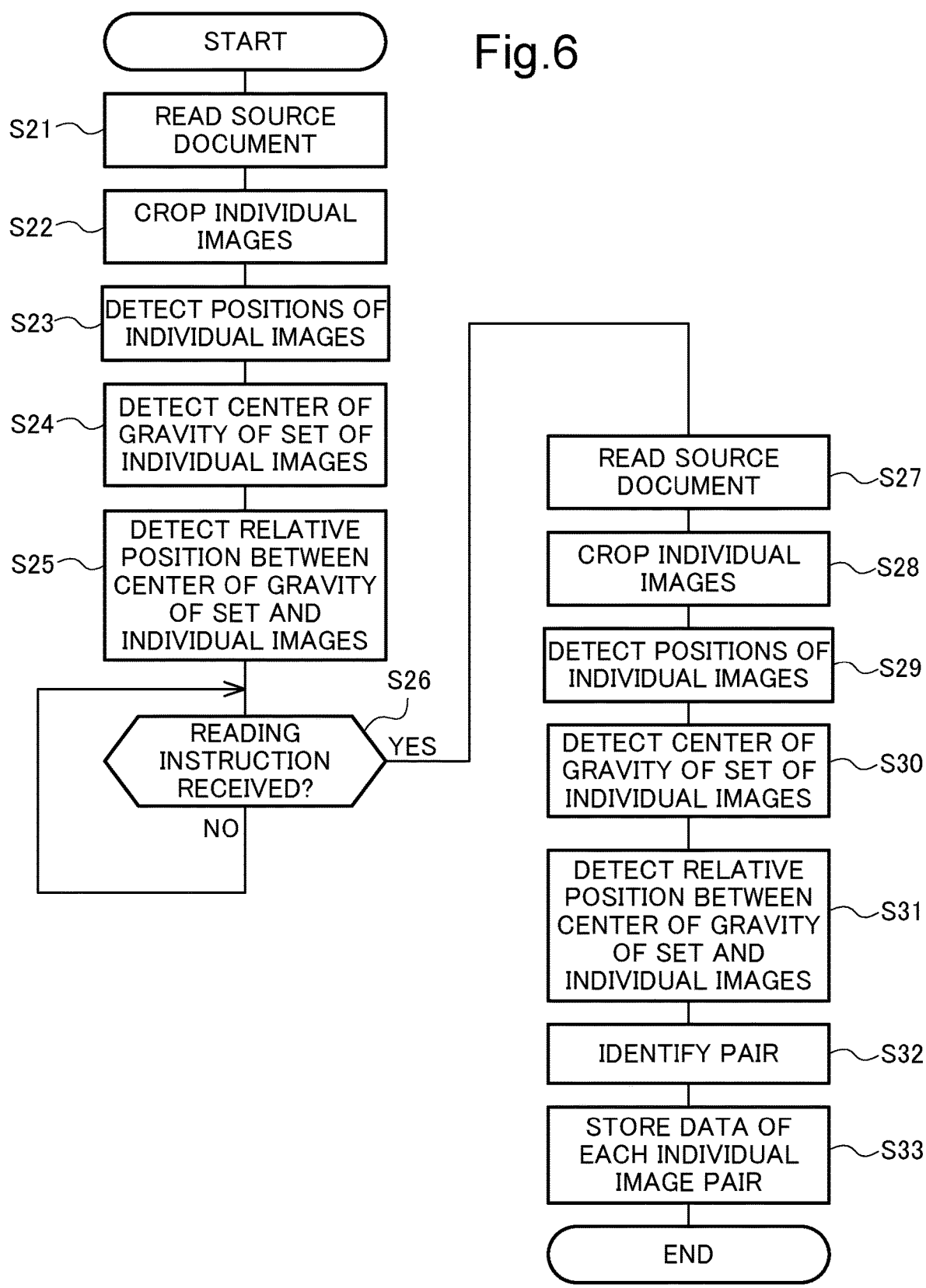

DOCUMENT READING DEVICE IDENTIFYING FRONT AND BACK FACES OF SAME DOCUMENT BASED ON RELATIVE POSITIONS OF CENTER OF GRAVITY OF CROPPED IMAGES

TECHNICAL FIELD

The present invention relates to an image reading device, and more particularly to a technique to collectively read a plurality of documents placed on a document table.

BACKGROUND ART

Some image reading devices are configured to collectively read a plurality of source documents placed on a document table, and automatically crop each of the source documents, as individual images independent from each other (what is known as multi-cropping function).

The mentioned function is further utilized to read a plurality of source documents (e.g., business cards) placed on the document table of the image reading device, and again read the plurality of source documents reversed by a user. Then pair identification is performed, by comparing the positions of the respective images of the source documents that have been reversed, with the positions of the respective images of the source documents unreversed yet, to thereby identify a pair of images the positions of which are closest to each other, as an image pair that represents the front and back faces of the same source document (see, for example, PTL 1 and 2).

CITATION LIST

Patent Literature

[PTL 1] Japanese Unexamined Patent Application Publication No. 2013-250725
[PTL 2] Japanese Unexamined Patent Application Publication No. 2006-339770

SUMMARY OF INVENTION

Technical Problem

FIG. 10 A and FIG. 10 B show a plurality of source documents placed on the document table. Specifically, the source documents D1 to D3 are placed on the document table 162. FIG. 10A represents the state where the source documents D1 to D3 are not yet reversed, and FIG. 10B represents the state where the source documents D1 to D3 have been reversed. Points P1 to P3 in the drawing denote the positions (center points) of the respective source document D1 to D3 unreversed yet, and points P4 to P6 denote the positions of the reversed source documents D1 to D3. Here, rectangles drawn by broken lines in FIG. 10B indicate the positions where the source documents D1 to D3 were placed before being reversed.

When the plurality of source documents D1 to D3 placed on the document table 162 are reversed by the user, in most cases the source documents D1 to D3 are not placed at the same position where the source documents D1 to D3 were initially placed, and therefore the positions P1 to P3 and the positions P4 to P6 are deviated from each other, as shown in FIG. 10B.

In such a case, when a distance L2 between the position P4 of the source document D1 that has been reversed, and the position P2 of another source document D2 unreversed yet, is shorter than a distance L1 between the position P4 of the source document D1, and the position P1 of the source document D1 unreversed yet, as shown in FIG. 10B, wrong images may be identified as a pair.

The present invention has been accomplished in view of the foregoing situation, and provides a technique to improve the accuracy in pair identification, in other words the accuracy in detection of the image pair representing the front and back faces of the same source document, when the front and back faces of each of a plurality of source documents are independently read.

Solution to Problem

In an aspect, the present invention provides an image reading device including a document reading unit configured to collectively read a plurality of source documents placed on a document table, an individual image cropper that crops an independent individual image of each of the source documents, from image data representing one face of the source documents and image data representing another face of the source documents, acquired after the source documents are reversed, both of the image data having been acquired through a reading operation of the document reading unit, a document position detector that detects a position of each of the individual images cropped by the individual image cropper from both of the image data, a reference document image selector that selects, as a reference document image, the individual image located closest to a predetermined position in the image data, on a basis of a position of each of the individual images detected by the document position detector from both of the image data, a first relative position detector that detects, with respect to each of the individual images other than the reference document image, a relative position indicating a positional relation relative to the reference document image selected by the reference document image selector in both of the image data, and a first pair identifier that performs pair identification including identifying, as an image pair representing front and back faces of a same source document, a pair of the individual images, the respective relative positions of which from the reference document image in one of the both image data, and from the reference document image in the other one of the both image data, are closest to each other.

In another aspect, the present invention provides an image reading device including a document reading unit configured to collectively read a plurality of source documents placed on a document table, an individual image cropper that crops an independent individual image of each of the source documents, from image data representing one face of the source documents and image data representing another face of the source documents, acquired after the source documents are reversed, both of the image data having been acquired through a reading operation of the document reading unit, a document position detector that detects a position of each of the individual images cropped by the individual image cropper from both of the image data, a gravity center detector that detects, with respect to each of the individual images, a center of gravity of a set composed of the individual images, on a basis of a position of each of the individual images detected by the document position detector from both of the image data, a second relative position detector that detects, with respect to each of the individual images, a relative position indicating a positional relation relative to the center of gravity detected by the gravity center detector in both of the image data, and a second pair identifier that performs pair identification including identifying, as an image pair representing front and back faces of a same source document, a pair of the individual images, the respective relative positions of which from the center of gravity in one of the both image data, and from the center of gravity in the other one of the both image data, are closest to each other.

In still another aspect, the present invention provides an image reading device including a document reading unit configured to collectively read a plurality of source documents placed on a document table, an individual image cropper that crops an independent individual image of each of the source documents, from image data representing one face of the source documents and image data representing another face of the source documents, acquired after the source documents are reversed, both of the image data having been acquired through a reading operation of the document reading unit, a document position detector that detects a position of each of the individual images cropped by the individual image cropper from both of the image data, a reference document image selector that selects, as a reference document image, the individual image located closest to a predetermined position in the image data, on a basis of a position of each of the individual images detected by the document position detector from both of the image data, a first relative position detector that detects, with respect to each of the individual images other than the reference document image, a relative position indicating a positional relation relative to the reference document image selected by the reference document image selector in both of the image data, a first pair identifier that performs pair identification including identifying, as an image pair representing front and back faces of a same source document, a pair of the individual images, the respective relative positions of which from the reference document image in one of the both image data, and from the reference document image in the other one of the both image data, are closest to each other, a gravity center detector that detects, with respect to each of the individual images, a center of gravity of a set composed of the individual images, on a basis of a position of each of the individual images detected by the document position detector from both of the image data, a second relative position detector that detects, with respect to each of the individual images, a relative position indicating a positional relation relative to the center of gravity detected by the gravity center detector in both of the image data, a second pair identifier that performs pair identification including identifying, as an image pair representing front and back faces of a same source document, a pair of the individual images, the respective relative positions of which from the center of gravity in one of the both image data, and from the center of gravity in the other one of the both image data, are closest to each other, and a validity decider that decides the pair identification as valid, when the pair identification performed by the first pair identifier and the pair identification performed by the second pair identifier present a same result, and decides the pair identification as invalid, when the pair identification performed by the first pair identifier and the pair identification performed by the second pair identifier present different results.

Advantageous Effects of Invention

With the foregoing configuration, improve the accuracy of the pair identification, in other words detection of the image pair representing the front and back faces of the same source document, can be improved, when the front and back faces of each of a plurality of source documents are independently read.

BRIEF DESCRIPTION OF DRAWINGS

FIG. 6 is a flowchart showing an example of an operation performed by a control unit of the image forming apparatus including the image reading device according to the second embodiment.

DESCRIPTION OF EMBODIMENTS

Figure 1:
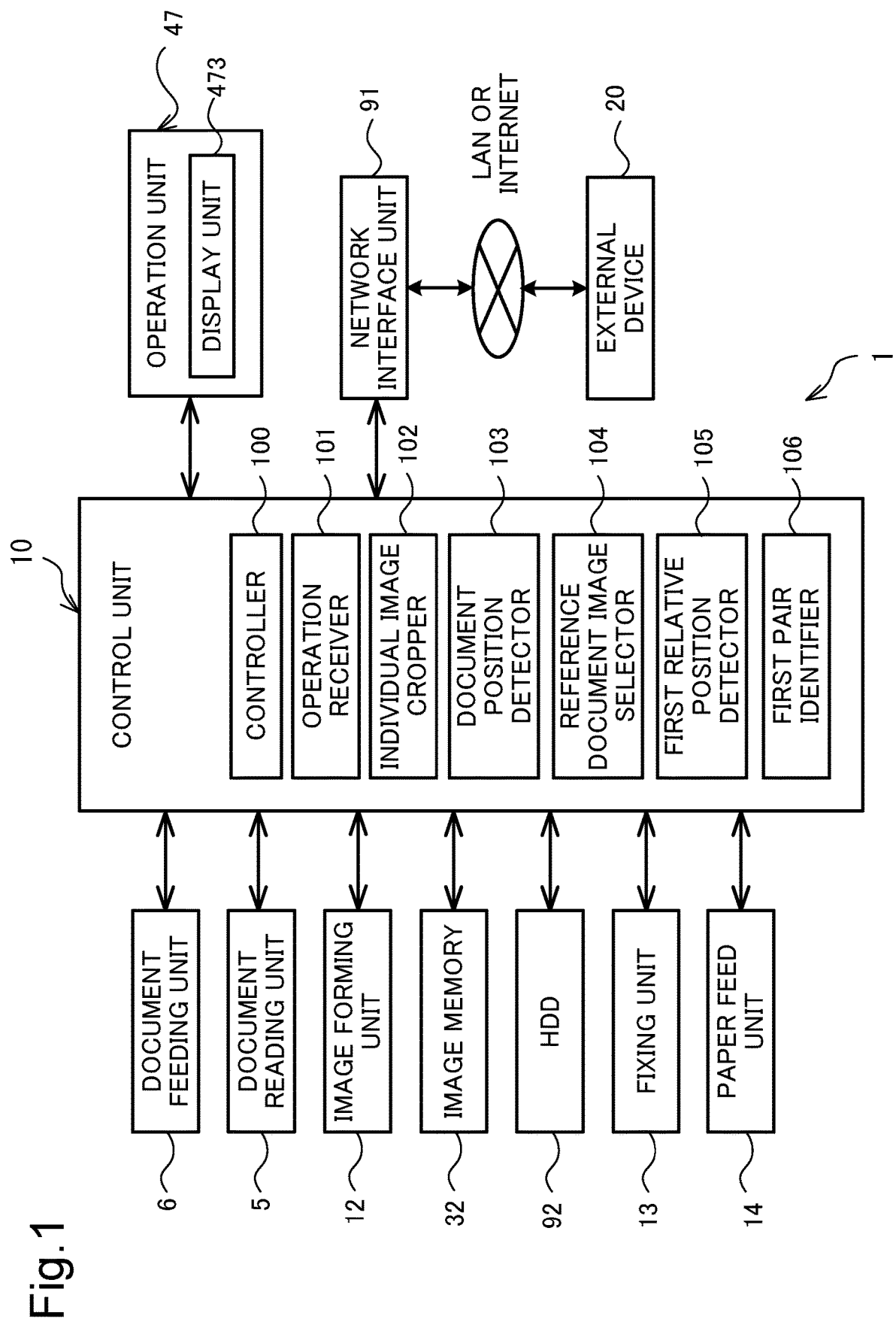
FIG. 1 is a functional block diagram schematically showing an essential internal configuration of an image forming apparatus, including an image reading device according to a first embodiment of the present invention.

Hereafter, an image reading device according to embodiments of the present invention will be described, with reference to the drawings. FIG. 1 is a functional block diagram schematically showing an essential internal configuration of an image forming apparatus, including the image reading device according to a first embodiment of the present invention.

The image forming apparatus 1 is a multifunction peripheral having a plurality of functions, such as copying, printing, scanning, and facsimile transmission, and includes a control unit 10, a document feeding unit 6, a document reading unit 5, an image forming unit 12, an image memory 32, a hard disk drive (HDD) 92, a fixing unit 13, a paper feed unit 14, an operation unit 47, and a network interface unit 91.

The document feeding unit 6 delivers a source document to be read, to the document reading unit 5. The document reading unit 5 illuminates, with a light emitter, the source document delivered from the document feeding unit 6, or placed on a document table 162 (see FIG. 3A and FIG. 3B), and receives the reflected light, to thereby read an image from the source document. The image data acquired through the reading operation of the document reading unit 5 is stored in the image memory 32. The document reading unit 5 is also configured to collectively read a plurality of source documents placed on the document table 162.

The image forming unit 12 forms a toner image of the image to be printed, on a sheet (recording medium). The image memory 32 is a region for temporarily storing the image data of the source document acquired through the reading operation of the document reading unit 5, and the data to be printed by the image forming unit 12.

The HDD 92 is a large-capacity storage device for storing the image of the source document read by the document reading unit 5. The fixing unit 13 fixes the toner image onto the sheet, by thermal compression. The paper feed unit 14 includes a non-illustrate paper cassette, and picks up and delivers the sheets stored in the paper cassette.

The operation unit 47 receives instructions from the user to execute the operations and processes that the image forming apparatus 1 is configured to perform. The operation unit 47 includes a display unit 473 for displaying, for example, an operation guide for the user. The display unit 473 is set up as a touch panel, so that the user can operate the image forming apparatus 1 by touching buttons and keys displayed on the screen.

The network interface unit 91 transmits and receives various data to and from an external device 20 such as a personal computer, in a local area or on the internet.

The control unit 10 includes a processor, a random-access memory (RAM), a read-only memory (ROM), and an exclusive hardware circuit. The processor is, for example, a central processing unit (CPU), an application specific integrated circuit (ASIC), or a micro processing unit (MPU). The control unit 10 includes a controller 100, an operation receiver 101, an individual image cropper 102, a document position detector 103, a reference document image selector 104, a first relative position detector 105, and a first pair identifier 106.

The control unit 10 acts as the controller 100, the operation receiver 101, the individual image cropper 102, the document position detector 103, the reference document image selector 104, the first relative position detector 105, and the first pair identifier 106, when the processor executes a control program stored in the HDD 92. Here, the controller 100 and other components may each be constituted in the form of a hardware circuit, instead of being performed according to the control program. This also applies to other embodiments, unless otherwise specifically noted.

The controller 100 serves to control the overall operation of the image forming apparatus 1. The controller 100 is connected to the document feeding unit 6, the document reading unit 5, the image forming unit 12, the image memory 32, the HDD 92, the fixing unit 13, the paper feed unit 14, the operation unit 47, and the network interface unit 91, and controls the operation of the mentioned components.

The operation receiver 101 receives inputs made by the user through the operation unit 47.

The individual image cropper 102 crops an independent individual image of each of the source documents, from image data representing one face of the source documents and image data representing the other face of the source documents, acquired after the source documents are reversed (hereinafter collectively referred to as "both of the image data"), acquired through the reading operation of the document reading unit 5.

The individual image cropper 102 performs, for example an edge detection, with respect to the image data acquired through the reading operation of the document reading unit 5, to thereby detect an edge image. Then the individual image cropper 102 crops, as the individual image, a rectangular image the four sides of which are defined by the edge image as a whole, from the image data acquired through the reading operation of the document reading unit 5, and from which the edge image has been detected.

The document position detector 103 detects the individual images corresponding to the individual images cropped by the individual image cropper 102, and the position of each of the individual images. For example, the document position detector 103 calculates the position of the individual image, from the coordinate position of the individual image in the image data acquired through the reading operation of the document reading unit 5. In this embodiment, the document position detector 103 detects the central point of each of the individual images as the position thereof (in this embodiment the individual images are formed in a rectangular shape, and therefore the intersection of the diagonal lines can be regarded as the central point).

The reference document image selector 104 selects, as a reference document image, the individual image located closest to a predetermined position (e.g., far left corner) in the image data, on the basis of the position of each of the individual images, detected by the document position detector 103 from both of the image data.

The first relative position detector 105 detects, with respect to each of the individual images other than the reference document image, a relative position indicating a positional relation relative to the reference document image, selected by the reference document image selector 104 in both of the image data.

The first pair identifier 106 performs pair identification including identifying, as an image pair representing the front and back faces of the same source document, a pair of the individual images, the respective relative positions of which from the reference document image in one of the image data, and from the reference document image in the other image data, are closest to each other.

Figure 2:
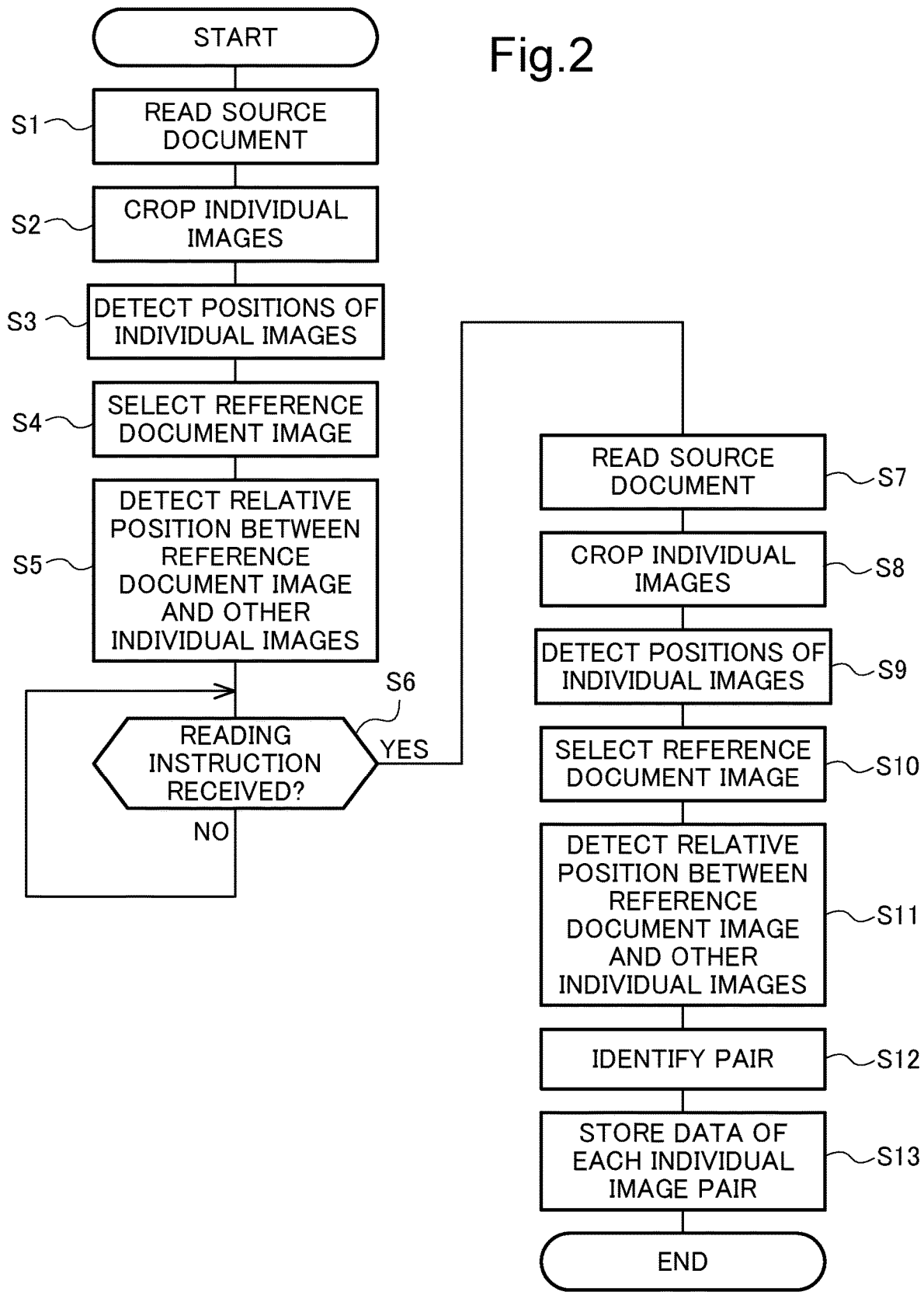
FIG. 2 is a flowchart showing an example of an operation performed by a control unit of the image forming apparatus including the image reading device according to the first embodiment.

Hereunder, an operation performed by the control unit 10 of the image forming apparatus 1, including the image reading device according to the first embodiment, will be described with reference to the flowchart shown in FIG. 2. The following operation is to be performed when the operation receiver 101 receives an instruction from the user, inputted through the operation unit 47, to read both faces of the source documents placed on the document table 162.

First, the controller 100 causes the document reading unit 5 to read the source documents placed on the document table 162, and stores image data acquired through the reading operation of the document reading unit 5, in the image memory 32 (S1). At this point, the document reading unit 5 reads one of the faces of the source documents, and acquires the corresponding image data.

Then the individual image cropper 102 crops an independent individual image of each of the source documents, from the image data acquired through the reading operation of the document reading unit 5, and stores the image data of the individual images that have been cropped, in the image memory 32 (S2). The document position detector 103 detects the positions (central points) of the respective individual images cropped by the individual image cropper 102 (S3).

The reference document image selector 104 then selects, as the reference document image, the individual image located closest to a position corresponding to a far left corner 162A (see FIG. 3A and FIG. 3B) of the document table 162 in the image data read at S1, on the basis of the position of each of the individual images detected by the document position detector 103 (S4). The first relative position detector 105 detects, on the basis of the central point of the reference document image and each of the individual images, the relative position of each of the individual images other than the reference document image, with respect to the reference document image selected by the reference document image selector 104, in the image data read at S1 (S5).

Figure 3A:
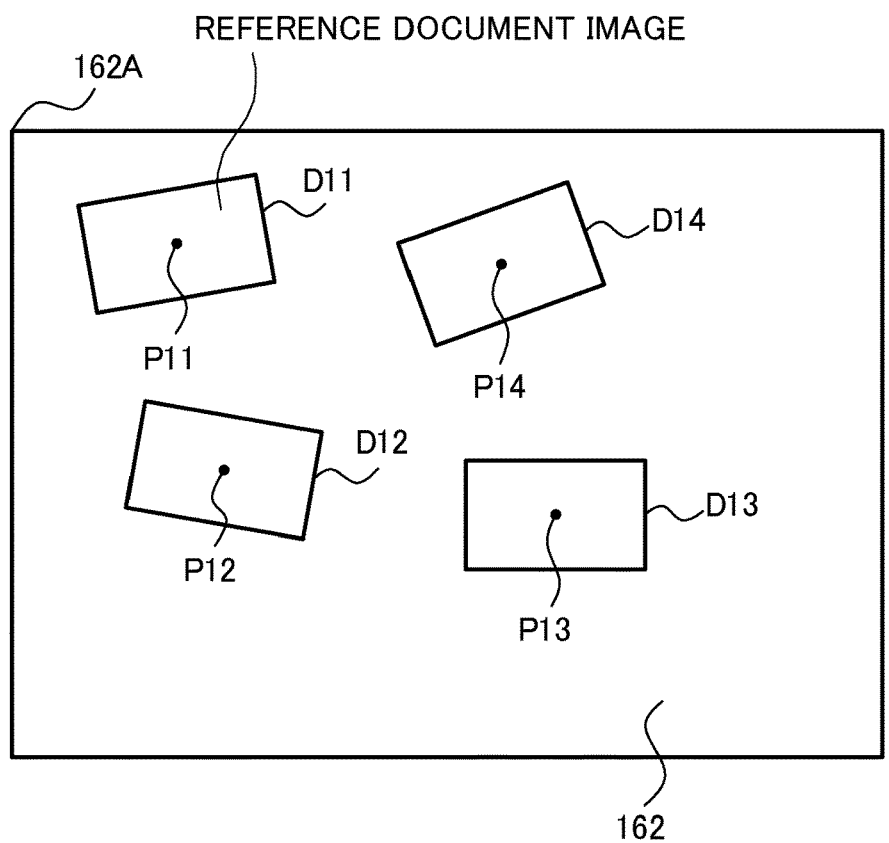
FIG. 3A and FIG. 3B are views showing a plurality of source documents placed on a document table, FIG. 3A representing a state before the source documents are reversed, and FIG. 3B representing a state after the source documents are reversed.

For example, as shown in FIG. 3A, when the plurality of source documents D11 to D14 are placed on the document table 162, the individual image corresponding to the source document D11, located closest to the far left corner 162A of the document table 162, is selected as the reference document image by the reference document image selector 104. Then the first relative position detector 105 detects the relative position with respect to the individual image serving as the reference document image, which corresponds to the source document D11, of each of the individual images corresponding to the source documents D11 to D14. To be more detailed, the first relative position detector 105 detects the relative position of the individual image corresponding to the source document D11 itself, with respect to the individual image corresponding to the source document D11, the relative position of the individual image corresponding to the source document D12, with respect to the individual image corresponding to the source document D11, the relative position of the individual image corresponding to the source document D13, with respect to the individual image corresponding to the source document D11, and the relative position of the individual image corresponding to the source document D14, with respect to the individual image corresponding to the source document D11. Thus, the first relative position detector 105 detects the position of each of the individual images respectively corresponding to the source documents D12 to D14, with respect to the central point (point P11), serving as the origin, of the individual image corresponding to the source document D11. Here, points P11 to P14 in FIG. 3A denote the position (central point) of the source documents D11 to D14.

Then the controller 100 decides whether the operation receiver 101 has received a renewed reading instruction of the source documents placed on the document table 162, inputted by the user through the operation unit 47 (S6). Here, it is assumed that the user reverses each of the source documents placed on the document table 162, before inputting the renewed reading instruction through the operation unit 47.

Upon deciding that the operation receiver 101 has received the renewed instruction (YES at S6), the controller 100 causes the document reading unit 5 to read the source documents placed on the document table, and stores the image data acquired through the reading operation of the document reading unit 5, in the image memory 32 (S7). Since the renewed instruction is inputted after the user has reversed the source documents D11 to D14, the document reading unit 5 reads the source documents D11 to D14 that have been reversed, in other words the other face of the source documents D11 to D14.

Thereafter, similarly to the operation of S2 and S3, the individual image cropper 102 crops the independent individual image of each of the source documents, from the image data acquired through the reading operation of the document reading unit 5, and stores the image data of the individual images that have been cropped, in the image memory 32 (S8), and then the document position detector 103 detects the positions of the respective individual images cropped by the individual image cropper 102 (S9).

The reference document image selector 104 then selects, as the reference document image, the individual image located closest to the far left corner 162A (see FIG. 3B) of the document table 162 in the image data read at S7, on the basis of the position of each of the individual images detected by the document position detector 103 (S10). The first relative position detector 105 detects, on the basis of the central point of the reference document image and each of the individual images, the relative position of each of the individual images other than the reference document image, with respect to the reference document image selected by the reference document image selector 104, in the image data read at S7 (S11).

Figure 3B:
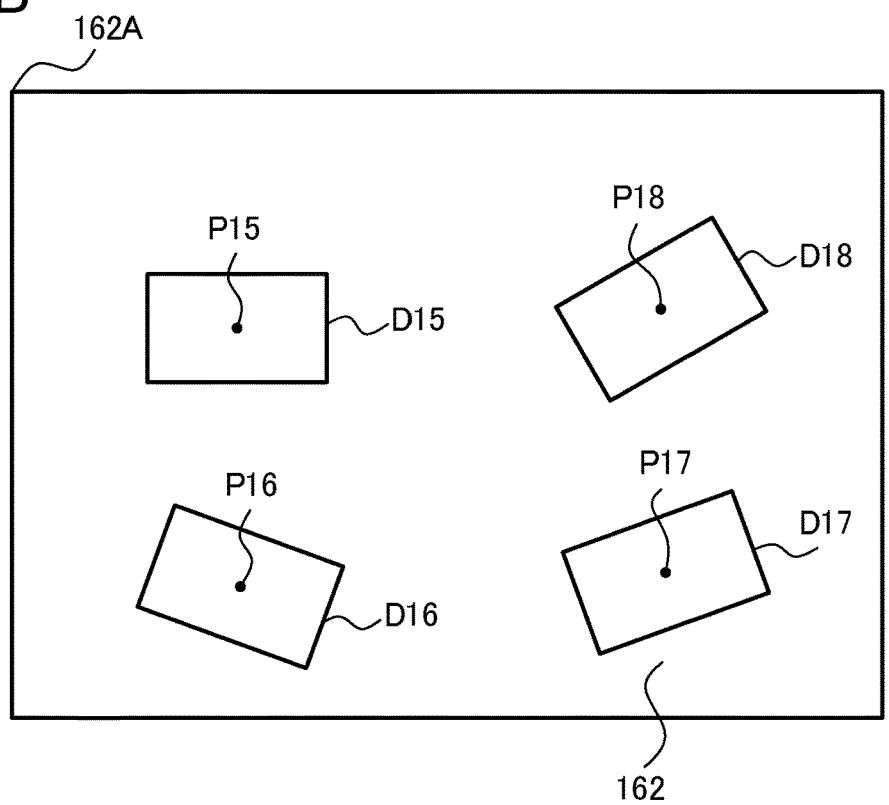

For example, as shown in FIG. 3B, when the plurality of source documents D15 to D18 are placed on the document table 162, the individual image corresponding to the source document D15, located closest to the far left corner 162A of the document table 162, is selected as the reference document image by the reference document image selector 104, and the first relative position detector 105 detects the relative position with respect to the individual image serving as the reference document image and corresponding to the source document D15, of each of the individual images corresponding to the source documents D15 to D18. To be more detailed, the first relative position detector 105 detects the relative position of the individual image corresponding to the source document D15 itself, with respect to the individual image corresponding to the source document D15, the relative position of the individual image corresponding to the source document D16, with respect to the individual image corresponding to the source document D15, the relative position of the individual image corresponding to the source document D17, with respect to the individual image corresponding to the source document D15, and the relative position of the individual image corresponding to the source document D18, with respect to the individual image corresponding to the source document D15. Thus, the first relative position detector 105 detects the position of each of the individual images respectively corresponding to the source documents D16 to D18, with respect to the central point (point P15), serving as the origin, of the individual image corresponding to the source document D15. Here, points P15 to P18 in FIG. 3B respectively denote the positions (central points) of the source documents D15 to D18.

Then the first pair identifier 106 performs the pair identification including selecting the individual images, the respective relative positions of which, from the reference document image in one image data acquired by the reading operation of S1 and from the reference document image in the other image data acquired at S7, indicate values closest to each other, from one and the other image data respectively, and identifying the selected individual images as the image pair representing the front and back faces of the same source document (S12).

Thereafter, the controller 100 stores, according to the identification result provided by the first pair identifier 106, the image data of the individual images stored in the image memory 32, with respect to each of the image pairs, in the external device 20 (e.g., personal computer) through a storage region designated by the user, for example the HDD 92 or the network interface unit 91 (S13).

Figure 4:
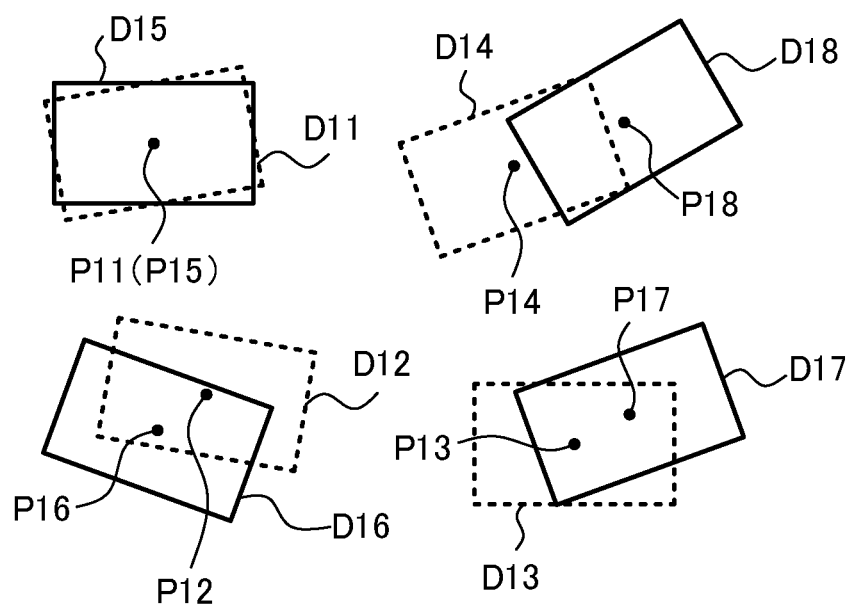
FIG. 4 is a view showing the reversed source documents and the unreversed source documents superposed on each other, using the reference document image of the reversed source document and the reference document image of the unreversed source document, as origins.

Referring now to FIG. 4, an example of the pair identification performed by the first pair identifier 106 will be described hereunder. FIG. 4 illustrates, on the basis of the example shown in FIG. 3A and FIG. 3B, the individual images of the reversed source documents and the individual images of the unreversed source documents superposed on each other, using the reference document image of the reversed source document and the reference document image of the unreversed source document as origins.

First Identification

First, the first pair identifier 106 performs the pair identification with respect to the individual image corresponding to the source document D11, in one image data acquired by the reading operation of S1. Since the individual image corresponding to the source document D11 itself is the reference document image in the example shown in FIG. 3A and FIG. 3B, the first relative position detector 105 detects the relative position of the individual image corresponding to the source document D11 with respect to the reference document image, as "0". Since the individual image corresponding to the source document D15 is also the reference document image in the other image data acquired by the reading operation of S7, the first relative position detector 105 detects the relative position of the individual image corresponding to the source document D15 with respect to the reference document image, as "0". Therefore, the first pair identifier 106 identifies the individual image corresponding to the source document D11, and the individual image corresponding to the source document D15, the relative positions of which are both "0", as constituting a pair.

Second Identification

The first pair identifier 106 then performs the pair identification with respect to the individual image corresponding to the source document D12, in one image data acquired by the reading operation of S1. The first pair identifier 106 detects the individual image, the relative position of which has been detected as closest to the relative position of the individual image corresponding to the source document D12, with respect to the reference document image in one image data acquired by the reading operation of S1, out of the individual images contained in the other image data acquired by the reading operation of S7. In the case of the example shown in FIG. 3A and FIG. 3B, the first pair identifier 106 identifies the individual image corresponding to the source document D12 and the individual image corresponding to the source document D16, the respective relative positions of which have the smallest value between each other, as constituting a pair.

Third Identification

The first pair identifier 106 then performs the pair identification with respect to the individual image corresponding to the source document D13, in one image data acquired by the reading operation of S1. The first pair identifier 106 detects the individual image, the relative position of which has been detected as closest to the relative position of the individual image corresponding to the source document D13, with respect to the reference document image in one image data acquired by the reading operation of S1, out of the individual images contained in the other image data acquired by the reading operation of S7. In the case of the example shown in FIG. 3A and FIG. 3B, the first pair identifier 106 identifies the individual image corresponding to the source document D12 and the individual image corresponding to the source document D17, the respective relative positions of which have the smallest value between each other, as constituting a pair.

Fourth Identification

The first pair identifier 106 then performs the pair identification with respect to the individual image corresponding to the source document D14, in one image data acquired by the reading operation of S1. The first pair identifier 106 detects the individual image, the relative position of which has been detected as closest to the relative position of the individual image corresponding to the source document D14, with respect to the reference document image in one image data acquired by the reading operation of S1, out of the individual images contained in the other image data acquired by the reading operation of S7. In the case of the example shown in FIG. 3A and FIG. 3B, the first pair identifier 106 identifies the individual image corresponding to the source document D14 and the individual image corresponding to the source document D18, the respective relative positions of which have the smallest value between each other, as constituting a pair.

Alternatively, the first pair identifier 106 may identify, as a pair, the individual image corresponding to the source document D14 in one image data acquired by the reading operation of S1, and the remaining individual image corresponding to the source document D18 in the other image data acquired by the reading operation of S7.

According to the first embodiment, the pair identification is performed including identifying, on the basis of the relative positions of the reference document image and the individual images other than the reference document image, the individual images the relative positions of which are closest to each other, from one and the other image data respectively, as an image pair representing the front and back faces of the same source document. In other words, the pair identification, for deciding whether a pair of images represent the front and back faces of the same document, is performed on the basis of the positional relation among the source documents placed on the document table 162 (relative positions of the source documents other than the reference source document, selected out of the plurality of source documents, with respect to the reference source document), which remains generally unchanged between before and after the user reverses the source documents on the document table 162. Therefore, the accuracy of the pair identification can be improved.

Figure 5:
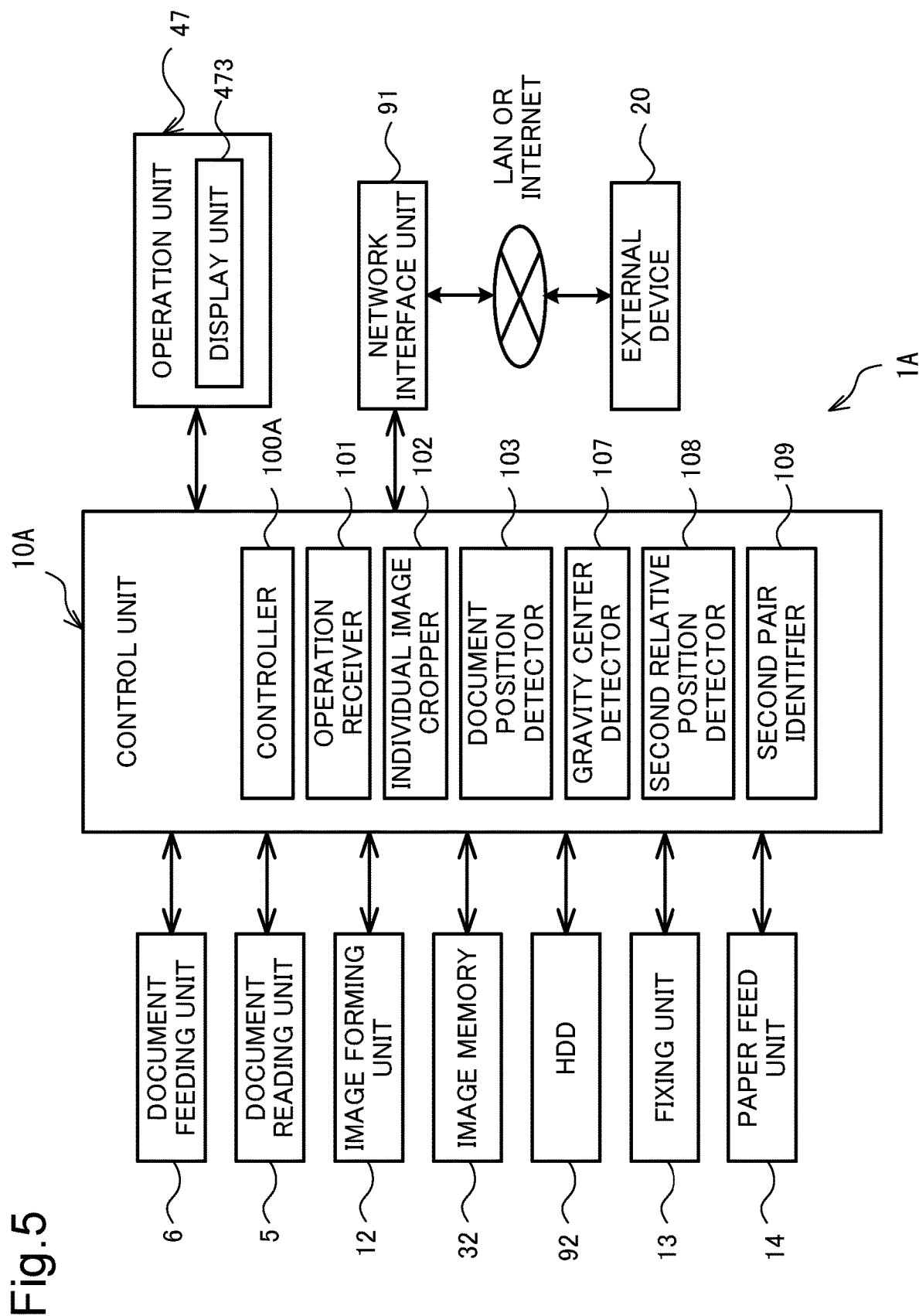
FIG. 5 is a functional block diagram schematically showing an essential internal configuration of an image forming apparatus, including an image reading device according to a second embodiment of the present invention.

FIG. 5 is a functional block diagram schematically showing an essential internal configuration of an image forming apparatus, including an image reading device according to a second embodiment of the present invention. The elements similar to those of the image forming apparatus 1 shown in FIG. 1 will be given the same numeral, and the description thereof will not be repeated. The second embodiment is different from the first embodiment in which the reference document image is employed as the origin, in that the center of gravity of a set composed of a plurality of source documents is employed as the origin.

The image forming apparatus 1A is a multifunction peripheral having a plurality of functions, such as copying, printing, scanning, and facsimile transmission, and includes a control unit 10A, a document feeding unit 6, a document reading unit 5, an image forming unit 12, an image memory 32, a hard disk drive (HDD) 92, a fixing unit 13, a paper feed unit 14, an operation unit 47, and a network interface unit 91.

The control unit 10A acts as a controller 100A, an operation receiver 101, an individual image cropper 102, a document position detector 103, a gravity center detector 107, a second relative position detector 108, and a second pair identifier 109, when the processor executes a control program stored in the HDD 92.

The controller 100A serves to control the overall operation of the image forming apparatus 1A. The controller 100A is connected to the document feeding unit 6, the document reading unit 5, the image forming unit 12, the image memory 32, the HDD 92, the fixing unit 13, the paper feed unit 14, the operation unit 47, and the network interface unit 91, and controls the operation of the mentioned components.

The gravity center detector 107 detects the center of gravity of a set composed of the individual images detected by the document position detector 103, in both of the image data. For example, the central point of a figure, formed by connecting the central points of the respective individual images detected by the document position detector 103 with straight lines, is detected as the center of gravity of the mentioned set.

The second relative position detector 108 detects, with respect to each of the individual images, the relative position indicating the positional relation relative to the center of gravity detected by the gravity center detector 107, in both of the image data.

The second pair identifier 109 performs the pair identification including identifying, as an image pair representing the front and back faces of the same source document, a pair of the individual images, the respective relative positions of which, from the center of gravity in one of the image data and from the center of gravity in the other image data, are closest to each other.

Hereunder, an operation performed by the control unit 10A of the image forming apparatus 1A, including the image reading device according to the second embodiment, will be described with reference to the flowchart shown in FIG. 6. The following operation is to be performed when the operation receiver 101 receives an instruction from the user, inputted through the operation unit 47, to read both faces of the source documents placed on the document table 162.

First, the controller 100A causes the document reading unit 5 to read the source documents placed on the document table 162, and stores image data acquired through the reading operation of the document reading unit 5, in the image memory 32 (S21). At this point, the document reading unit 5 reads one of the faces of the source documents, and acquires the corresponding image data.

Then the individual image cropper 102 crops an independent individual image of each of the source documents, from the image data acquired through the reading operation of the document reading unit 5, and stores the image data of the individual images that have been cropped, in the image memory 32 (S22). The document position detector 103 detects the positions (central points) of the respective individual images cropped by the individual image cropper 102 (S23).

The gravity center detector 107 then detects the center of gravity of the set composed of the individual images detected by the document position detector 103 (S24). The second relative position detector 108 detects the relative position between the center of gravity G1 detected by the gravity center detector 107 and each of the individual images (S25).

Figure 7A:
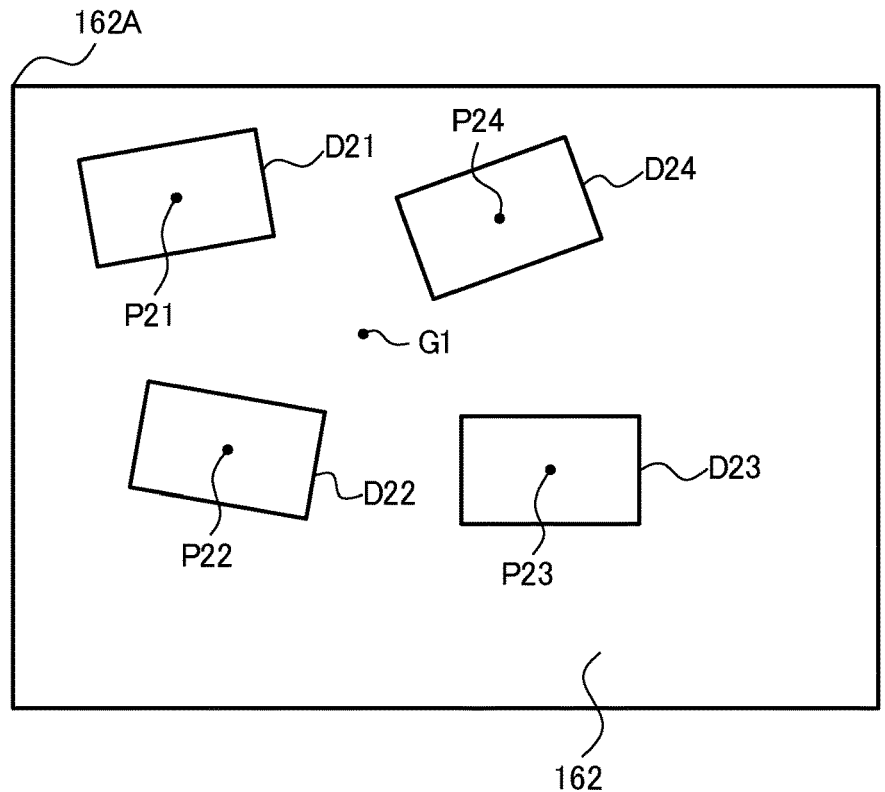
FIG. 7A and FIG. 7B are views showing a plurality of source documents placed on a document table, FIG. 7A representing a state before the source documents are reversed, and FIG. 7B representing a state after the source documents are reversed.

For example, when the plurality of source documents D21 to D24 are placed on the document table 162 as shown in FIG. 7A, the gravity center detector 107 detects the center of gravity G1 of the set composed of the individual images respectively corresponding to the source documents D21 to D24, and the second relative position detector 108 detects the relative position between the center of gravity G1 and each of the individual images corresponding to the source documents D21 to D24. In other words, the second relative position detector 108 detects the relative position of each of the individual images corresponding to the source documents D21 to D24, with respect to the center of gravity G1 serving as the origin. To be more detailed, the second relative position detector 108 detects the relative position of the individual image corresponding to the source document D21 with respect to the center of gravity G1, the relative position of the individual image corresponding to the source document D22 with respect to the center of gravity G1, the relative position of the individual image corresponding to the source document D23 with respect to the center of gravity G1, and the relative position of the individual image corresponding to the source document D24 with respect to the center of gravity G1. Here, points P21 to P24 in FIG. 7A respectively denote the positions (central points) of the source documents D21 to D24.

Then the controller 100A decides whether the operation receiver 101 has received a renewed reading instruction of the source documents placed on the document table 162, inputted by the user through the operation unit 47 (S26). Here, it is assumed that the user reverses each of the source documents placed on the document table 162, before inputting the renewed reading instruction through the operation unit 47.

Upon deciding that the operation receiver 101 has received the renewed instruction (YES at S26), the controller 100A causes the document reading unit 5 to read the source documents placed on the document table, and stores the image data acquired through the reading operation of the document reading unit 5, in the image memory 32 (S27). Since the renewed instruction is inputted after the user has reversed the source documents D21 to D24, the document reading unit 5 reads the source documents D21 to D24 that have been reversed, in other words the other face of the source documents D21 to D24.

Thereafter, similarly to the operation of S22 and S23, the individual image cropper 102 crops the independent individual image of each of the source documents, from the image data acquired through the reading operation of the document reading unit 5, and stores the image data of the individual images that have been cropped, in the image memory 32 (S28). The document position detector 103 detects the positions of the respective individual images cropped by the individual image cropper 102 (S29).

The gravity center detector 107 then detects the center of gravity G2 of the set composed of the individual images detected by the document position detector 103 (S30). The second relative position detector 108 detects the relative position between the center of gravity G2 detected by the gravity center detector 107 and each of the individual images (S31).

Figure 7B:
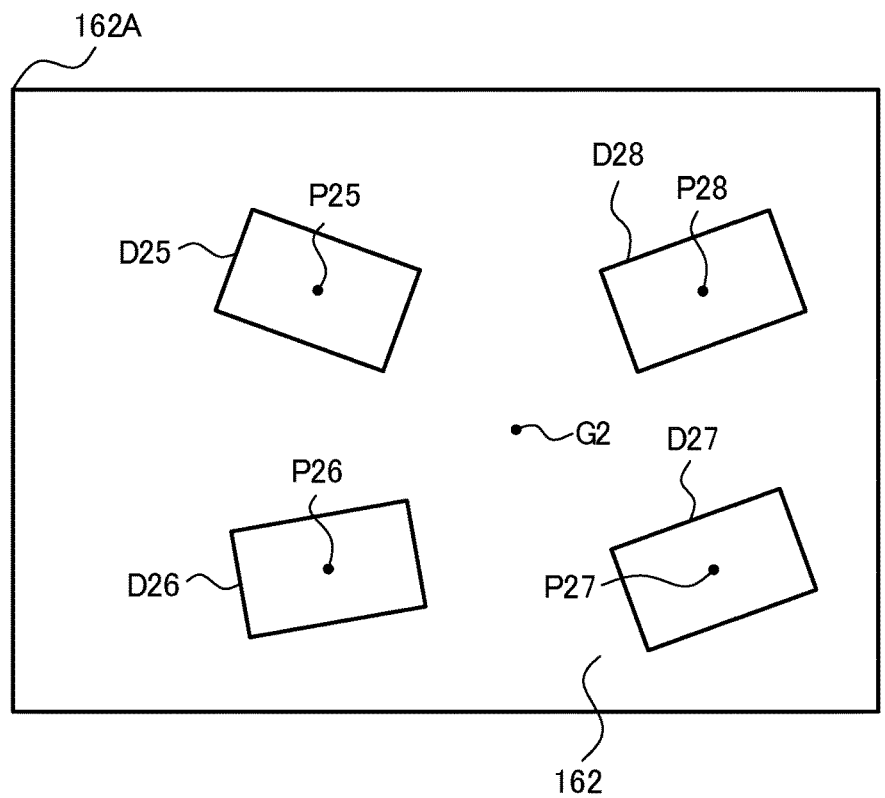

For example, when the plurality of source documents D25 to D28 are placed on the document table 162 as shown in FIG. 7B, the center of gravity G2 of the set composed of the individual images respectively corresponding to the source documents D25 to D28 is detected, and the relative position between the center of gravity G2 and each of the individual images corresponding to the source documents D25 to D28 is detected. In other words, the second relative position detector 108 detects the relative position of each of the individual images corresponding to the source documents D25 to D28, with respect to the center of gravity G2 serving as the origin. To be more detailed, the second relative position detector 108 detects the relative position of the individual image corresponding to the source document D25 with respect to the center of gravity G2, the relative position of the individual image corresponding to the source document D26 with respect to the center of gravity G2, the relative position of the individual image corresponding to the source document D27 with respect to the center of gravity G2, and the relative position of the individual image corresponding to the source document D28 with respect to the center of gravity G2. Here, points P25 to P28 in FIG. 7B respectively denote the positions (central points) of the source documents D25 to D28.

Then the second pair identifier 109 performs the pair identification including identifying, as the image pair representing the front and back faces of the same source document, the individual images the respective relative positions of which, from the center of gravity G1 in one image data acquired by the reading operation of S21 and from the center of gravity G2 in the other image data acquired at S27, are closest to each other (S32).

Thereafter, the controller 100A stores, according to the identification result provided by the second pair identifier 109, the image data of the individual images stored in the image memory 32, with respect to each of the image pairs, in the external device 20 (e.g., personal computer) through a storage region designated by the user, for example the HDD 92 or the network interface unit 91 (S33).

Figure 8:
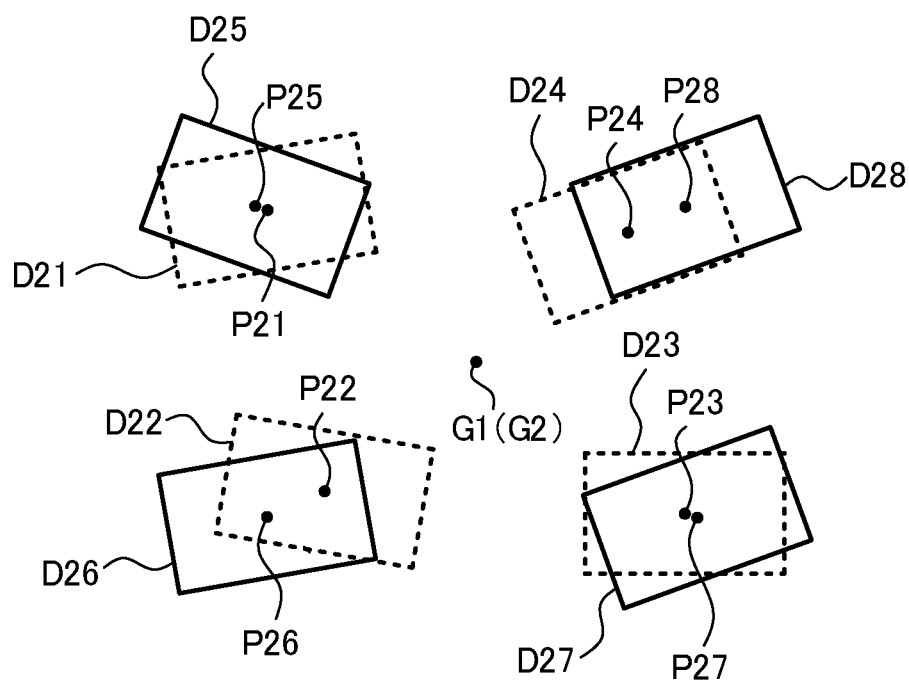
FIG. 8 is a view showing the reversed source documents and the unreversed source documents superposed on each other, using the center of gravity of the set composed of the plurality of source documents as origin.

FIG. 8 illustrates the individual image corresponding to the reversed source documents and the individual image corresponding to the unreversed source documents superposed on each other, using the center of gravity of the set composed of the plurality of source documents as origin. An example of the pair identification performed by the second pair identifier 109 will be described hereunder, with reference to FIG. 8

First Identification

First, the second pair identifier 109 performs the pair identification with respect to the individual image corresponding to the source document D21, in one image data acquired by the reading operation of S21.

The second pair identifier 109 detects the individual image, the relative position of which has been detected as closest to the relative position of the individual image corresponding to the source document D21, with respect to the center of gravity G1 in one image data acquired by the reading operation of S21, out of the individual images contained in the other image data acquired by the reading operation of S27. In the case of the example shown in FIG. 7A and FIG. 7B, the second pair identifier 109 identifies the individual image corresponding to the source document D21 and the individual image corresponding to the source document D25, as constituting a pair.

Second Identification

The second pair identifier 109 then performs the pair identification with respect to the individual image corresponding to the source document D22, in one image data acquired by the reading operation of S21. The second pair identifier 109 detects the individual image, the relative position of which has been detected as closest to the relative position of the individual image corresponding to the source document D22, with respect to the center of gravity G1 in one image data acquired by the reading operation of S21, out of the individual images contained in the other image data acquired by the reading operation of S27. In the case of the example shown in FIG. 7A and FIG. 7B, the second pair identifier 109 identifies the individual image corresponding to the source document D22 and the individual image corresponding to the source document D26, as constituting a pair.

Third Identification

The second pair identifier 109 then performs the pair identification with respect to the individual image corresponding to the source document D23, in one image data acquired by the reading operation of S21. The second pair identifier 109 detects the individual image, the relative position of which has been detected as closest to the relative position of the individual image corresponding to the source document D23, with respect to the center of gravity G1 in one image data acquired by the reading operation of S21, out of the individual images contained in the other image data acquired by the reading operation of S27. In the case of the example shown in FIG. 7A and FIG. 7B, the second pair identifier 109 identifies the individual image corresponding to the source document D23 and the individual image corresponding to the source document D27, as constituting a pair.

Fourth Identification

The second pair identifier 109 then performs the pair identification with respect to the individual image corresponding to the source document D24, in one image data acquired by the reading operation of S21. The second pair identifier 109 detects the individual image, the relative position of which has been detected as closest to the relative position of the individual image corresponding to the source document D24, with respect to the center of gravity G1 in one image data acquired by the reading operation of S21, out of the individual images contained in the other image data acquired by the reading operation of S27. In the case of the example shown in FIG. 7A and FIG. 7B, the second pair identifier 109 identifies the individual image corresponding to the source document D24 and the individual image corresponding to the source document D28, as constituting a pair.

Regarding the individual image corresponding to the last source document, the second pair identifier 109 may alternatively identify, as a pair, the individual image corresponding to the source document D24 in one image data acquired by the reading operation of S21, and the remaining individual image corresponding to the source document D28 in the other image data acquired by the reading operation of S27.

According to the second embodiment, the pair identification is performed including identifying, on the basis of the relative positions between the individual images and the center of gravity G1 and G2 of the set of the individual images corresponding to the plurality of source documents, the individual images closest to the center of gravity from one and the other image data respectively, as an image pair representing the front and back faces of the same source document. In other words, the pair identification, for deciding whether a pair of images represent the front and back faces of the same document, is performed on the basis of the positional relation among the source documents placed on the document table 162 (relative positions of the respective source documents with respect to the center of gravity), which remains generally unchanged between before and after the user reverses the source documents on the document table 162. Therefore, the accuracy of the pair identification can be improved.

Figure 9:
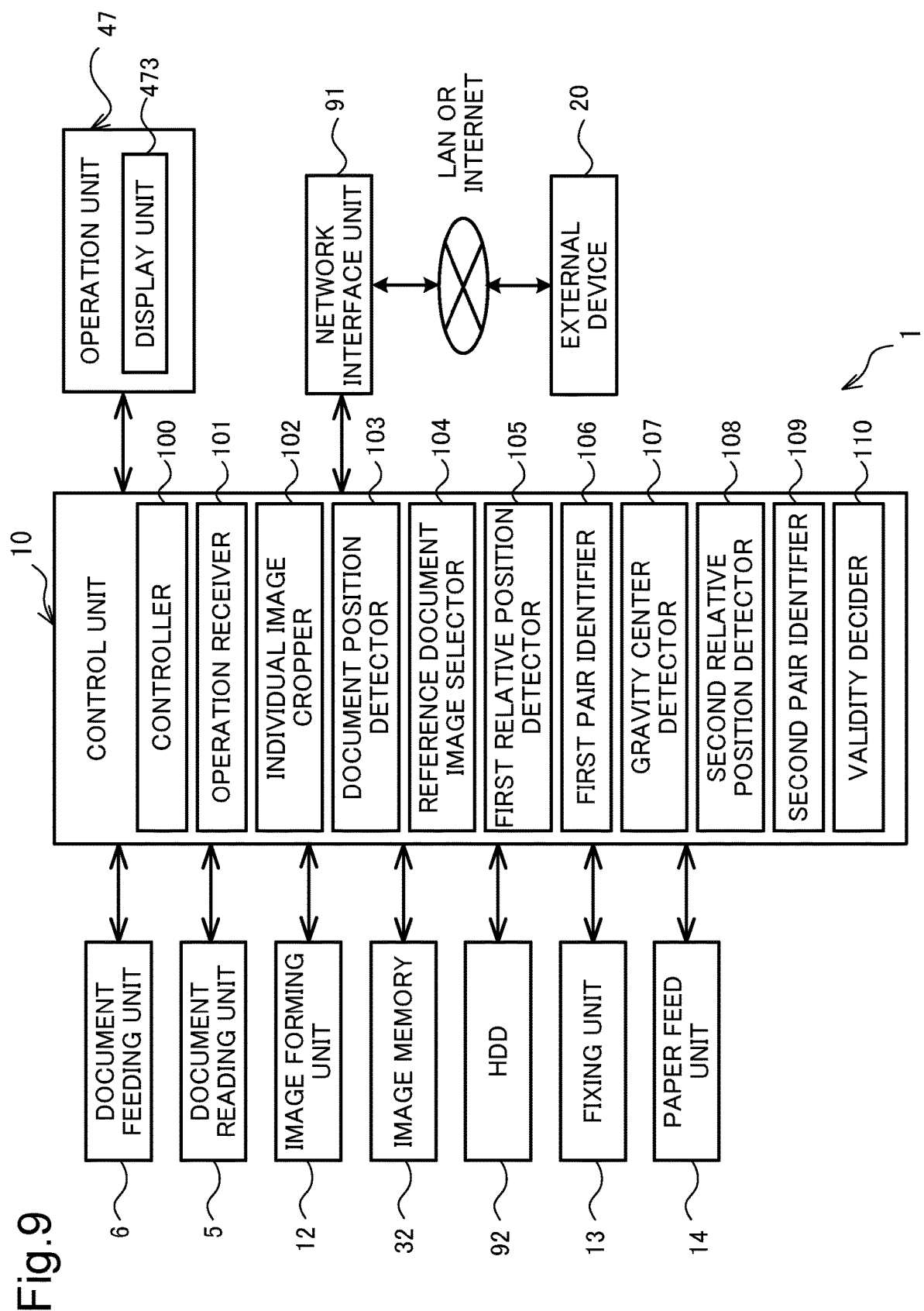
FIG. 9 is a functional block diagram schematically showing an essential internal configuration of an image forming apparatus, including an image reading device according to a third embodiment of the present invention.
Figure 10A:
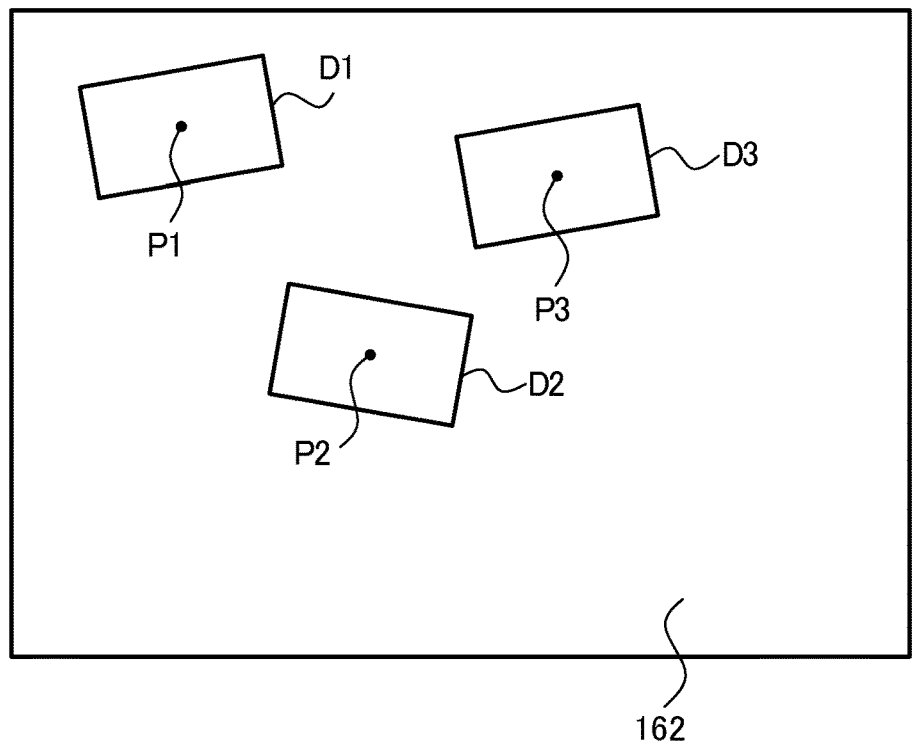
FIG. 10A and FIG. 10B are views showing a plurality of source documents placed on a document table, FIG. 10A representing a state before the source documents are reversed, and FIG. 10B representing a state after the source documents are reversed.
Figure 10B:
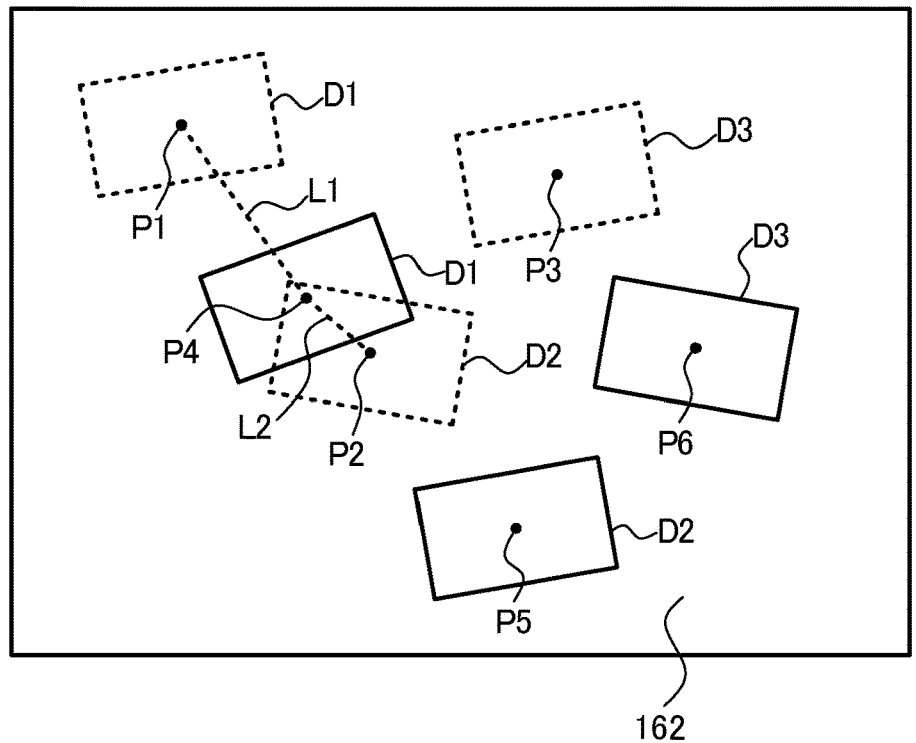
Figure 11:
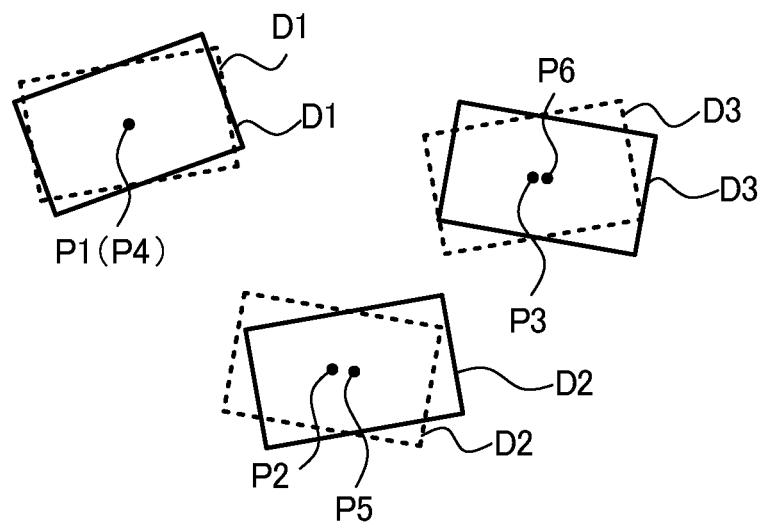
FIG. 11 is a view showing the reversed source documents and the unreversed source documents, superposed on each other.

The present invention is not limited to the foregoing embodiments, but may be modified in various manners. For example, although the first pair identifier 106 performs the pair identification based on the relative positional relation in the first embodiment, and the second pair identifier 109 performs the pair identification based on the center of gravity in the second embodiment, the image forming apparatus 1 according to a third embodiment may further be provided, which includes, as shown in FIG. 9, the gravity center detector 107, the second relative position detector 108, and the second pair identifier 109 of the second embodiment in addition to the configuration of the image forming apparatus 1 according to the first embodiment, and further includes a validity decider 110. The control unit 10 acts as the controller 100, the operation receiver 101, the individual image cropper 102, the document position detector 103, the reference document image selector 104, the first relative position detector 105, the first pair identifier 106, the gravity center detector 107, the second relative position detector 108, the second pair identifier 109, and the validity decider 110, when the processor executes a control program stored in the HDD 92.

The validity decider 110 decides the pair identification as valid, when the pair identification performed by the first pair identifier 106 and the pair identification performed by the second pair identifier 109 present the same result, and decides the pair identification as invalid, when the pair identification performed by the first pair identifier 106 and the pair identification performed by the second pair identifier 109 present different results.

For example, the validity decider 110 decides as valid the pair identification performed by the first pair identifier 106 and the second pair identifier 109, with respect to all of the individual images of a plurality of source documents, only when the first pair identifier 106 and the second pair identifier 109 present the same pair identification results with respect to all of the plurality of source documents. Further, when the first pair identifier 106 and the second pair identifier 109 present different pair identification results with respect to one of the individual images of the plurality of source documents, the validity decider 110 decides as invalid all of the pair identification results, including the pair identification performed by the first pair identifier 106 and the second pair identifier 109 with respect to all of the remaining individual images of the source documents. Such an arrangement further improves the accuracy of the pair identification.

When the first pair identifier 106 and the second pair identifier 109 present different pair identification results, with respect to even one of the individual images of the plurality of source documents, the validity decider 110 may decide as valid the pair identification performed by the second pair identifier 109, with respect to all of the individual images of the plurality of source documents, even though the first pair identifier 106 and the second pair identifier 109 both present the same pair identification results, with respect to any of the individual images of the source documents. In this case, the controller 100 may cause the display unit 473 to display a message to the effect that the pair identification performed by the second pair identifier 109 has been decided as valid.

Further, the validity decider 110 may decide the validity as follows. With reference to FIG. 3A and FIG. 3B as an example, it will be assumed that the first pair identifier 106 has identified the individual image of the source document D11 and the individual image of the source document D15 as a pair, the individual image of the source document D12 and the individual image of the source document D16 as a pair, the individual image of the source document D13 and the individual image of the source document D17 as a pair, and the individual image of the source document D14 and the individual image of the source document D18 as a pair.

In this case, when the second pair identifier 109 identifies the individual image of the source document D11 and the individual image of the source document D15 as a pair, the individual image of the source document D12 and the individual image of the source document D16 as a pair, the individual image of the source document D13 and the individual image of the source document D18 as a pair, and the individual image of the source document D14 and the individual image of the source document D17 as a pair, the validity decider 110 may decide as valid the pair identification of the individual image of the source document D11 and the individual image of the source document D15, and the pair identification of the individual image of the source document D12 and the individual image of the source document D16, the identification results of which are the same, but decide as invalid the pair identification of the individual images of the source documents D13, D14, D17, and D18. Such an arrangement improves the accuracy of the pair identification, with respect to each individual source document.

The configurations and processings according to the embodiments, described with reference to FIG. 1 to FIG. 11, are merely exemplary and in no way intended to limit the present invention to those configurations and processings.

The invention claimed is:

1. An image reading device comprising:
a document reading unit configured to collectively read a plurality of source documents placed on a document table;
an individual image cropper that crops an independent individual image of each of the source documents, from image data representing one face of the source documents and image data representing another face of the source documents, acquired after the source documents are reversed, both of the image data having been acquired through a reading operation of the document reading unit;
a document position detector that detects a position of each of the individual images cropped by the individual image cropper from both of the image data;
a gravity center detector that detects, with respect to each of the individual images, a center of gravity of a set composed of the individual images, on a basis of a position of each of the individual images detected by the document position detector from both of the image data;
a second relative position detector that detects, with respect to each of the individual images, a relative position indicating a positional relation relative to the center of gravity detected by the gravity center detector in both of the image data; and
a second pair identifier that performs pair identification including identifying, as an image pair representing front and back faces of a same source document, a pair of the individual images, the respective relative positions of which, from the center of gravity in one of the both image data and from the center of gravity in the other one of the both image data, are closest to each other.

2. An image reading device comprising:
- a document reading unit configured to collectively read a plurality of source documents placed on a document table;
- an individual image cropper that crops an independent individual image of each of the source documents, from image data representing one face of the source documents and image data representing another face of the source documents, acquired after the source documents are reversed, both of the image data having been acquired through a reading operation of the document reading unit;
- a document position detector that detects a position of each of the individual images cropped by the individual image cropper from both of the image data;
- a reference document image selector that selects, as a reference document image, the individual image located closest to a predetermined position in the image data, on a basis of a position of each of the individual images detected by the document position detector from both of the image data;
- a first relative position detector that detects, with respect to each of the individual images other than the reference document image, a relative position indicating a positional relation relative to the reference document image selected by the reference document image selector in both of the image data;
- a first pair identifier that performs pair identification including identifying, as an image pair representing front and back faces of a same source document, a pair of the individual images, the respective relative positions of which, from the reference document image in one of the both image data and from the reference document image in the other one of the both image data, are closest to each other;
- a gravity center detector that detects, with respect to each of the individual images, a center of gravity of a set composed of the individual images, on a basis of a position of each of the individual images detected by the document position detector from both of the image data;
- a second relative position detector that detects, with respect to each of the individual images, a relative position indicating a positional relation relative to the center of gravity detected by the gravity center detector in both of the image data;
- a second pair identifier that performs pair identification including identifying, as an image pair representing front and back faces of a same source document, a pair of the individual images, the respective relative positions of which, from the center of gravity in one of the both image data and from the center of gravity in the other one of the both image data, are closest to each other; and
- a validity decider that decides the pair identification as valid, when the pair identification performed by the first pair identifier and the pair identification performed by the second pair identifier present a same result, and decides the pair identification as invalid, when the pair identification performed by the first pair identifier and the pair identification performed by the second pair identifier present different results.

3. The image reading device according to claim 2,
- wherein the validity decider decides as valid the pair identification performed by the first pair identifier and the second pair identifier, with respect to all of the individual images of the plurality of source documents, only when the first pair identifier and the second pair identifier present same pair identification results with respect to all of the individual images of the plurality of source documents, and
- decides all of the pair identification results as invalid, including the pair identification performed by the first pair identifier and the second pair identifier with respect to all of the remaining individual images of the source documents, when the first pair identifier and the second pair identifier present different pair identification results with respect to one of the individual images of the plurality of source documents.

4. The image reading device according to claim 2,
- wherein, when the first pair identifier and the second pair identifier present different pair identification results, with respect to even one of the individual images of the plurality of source documents, the validity decider decides as valid the pair identification performed by the second pair identifier, with respect to all of the individual images of the plurality of source documents, even though the first pair identifier and the second pair identifier present same pair identification results, with respect to any of the individual images of the source documents.

5. The image reading device according to claim 4, further comprising:
- a display unit; and
- a controller that causes the display unit to display a message that the pair identification performed by the second pair identifier has been decided as valid, when the validity decider decides as valid the pair identification performed by the second pair identifier with respect to all of the individual images of the plurality of source documents.

6. The image reading device according to claim 2,
- wherein, when the first pair identifier and the second pair identifier present same pair identification results with respect to a part of the individual images of the plurality of source documents, the validity decider decides as valid the pair identification performed by the first pair identifier and the second pair identifier, with respect to the part of the individual images of the plurality of source documents, and
- decides as invalid the pair identification performed by the first pair identifier and the second pair identifier, with respect to the remaining individual images of the plurality of source documents, when the first pair identifier and the second pair identifier present different pair identification results with respect to the remaining individual images of the plurality of source documents.

* * * * *